Patented May 19, 1931

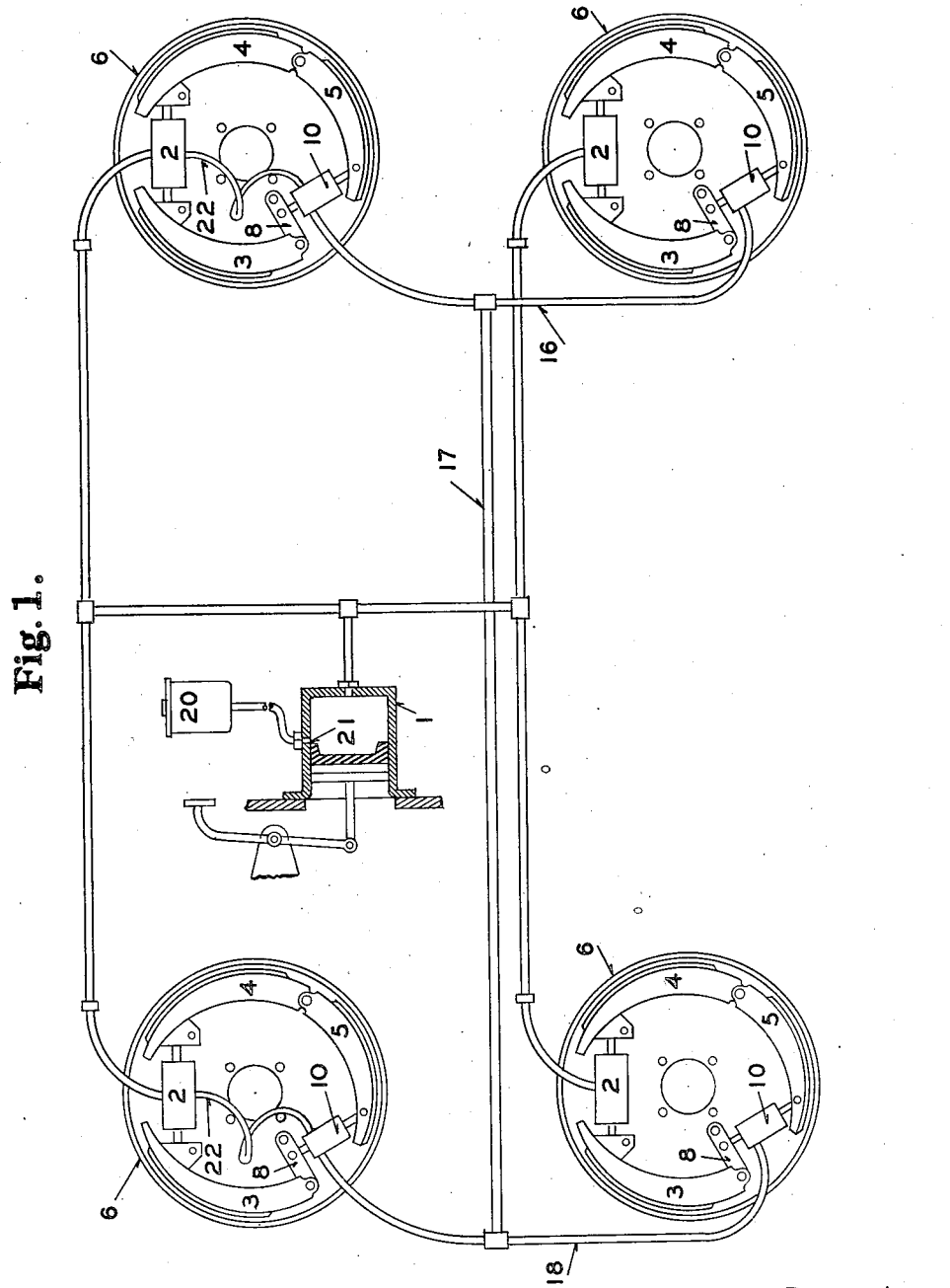

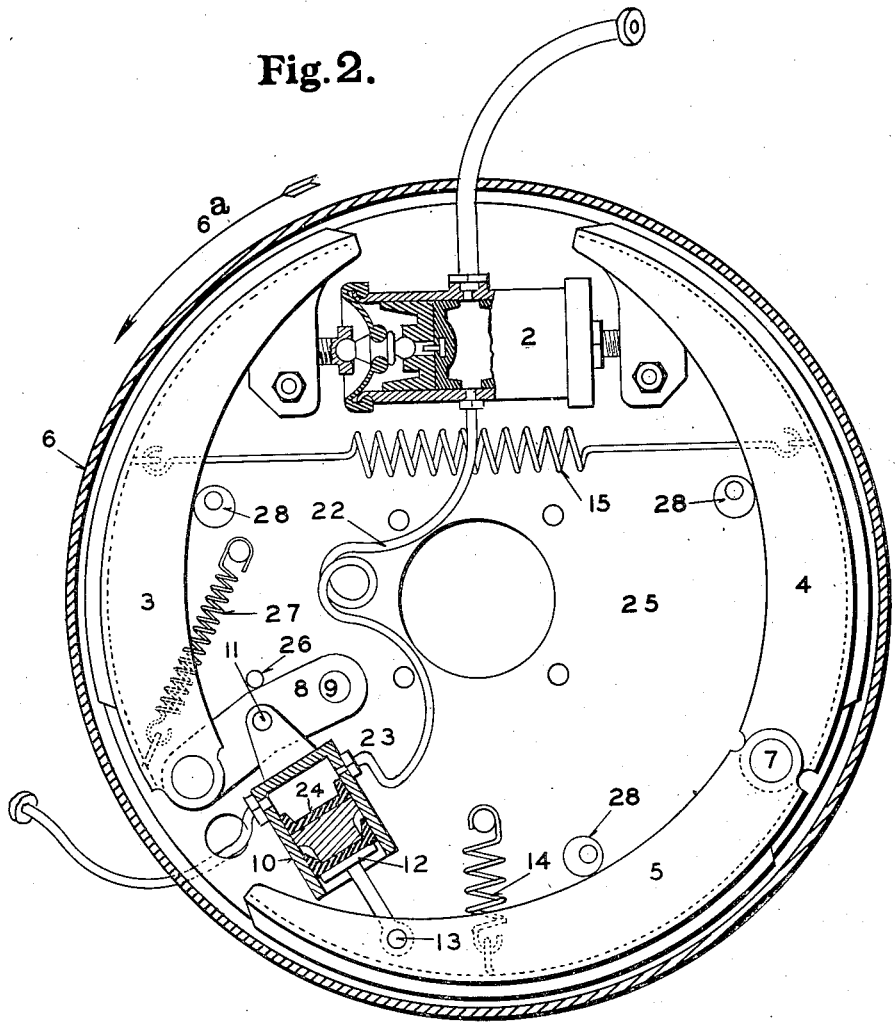

1,806,151

UNITED STATES PATENT OFFICE

BURNS DICK, OF ST. LOUIS, MISSOURI, ASSIGNOR TO WAGNER ELECTRIC CORPORATION, OF ST. LOUIS, MISSOURI, A CORPORATION OF DELAWARE

BRAKING APPARATUS

Application filed March 18, 1929. Serial No. 347,872.

My invention pertains to braking apparatus of the "regenerative" type in which a primary shoe is so mounted as to be capable of limited bodily movement in the direction in which the brake drum tends to impel it when it is applied thereto, and is so connected to a secondary shoe as to apply a braking pressure to it varying with the friction between the primary shoe and the brake drum and the leverage of the connection between the shoes.

This type of apparatus is employed for the purpose of increasing the total braking effect without increasing the pedal pressure applied to actuate the primary shoe, and therefore makes possible manual brake control of large vehicles without expenditure of greater effort on the part of the operator than required in the smaller vehicles using the ordinary types of brakes in which the braking effect depends entirely upon the pedal pressure.

In the regenerative type of brake referred to the pressure on the secondary shoe depends upon the frictional action between the brake drum and the primary shoe, and even though the pressure on the primary shoes on two or more wheels be equalized and the lining of these shoes of the same material and designed to have equal areas of contact with their brake drums, the resulting frictional drags on the shoes may not be the same, due to the varying conditions of the brake linings or the presence of dirt, oil or grease between the frictional surfaces, with the result that the pressures on the secondary shoes of the wheels may not be equal and the total braking effect on the wheels therefore not equalized. The invention described in my Patent No. 1,659,811 issued February 21, 1928, overcomes this difficulty and provides means whereby the pressures applied to the secondary brake shoes of two or more wheels of a vehicle will be the same. The present invention relates to an improvement in the apparatus of said patent to provide convenient means whereby the possible expansion or contraction (resulting from change of temperature from the normal operating range) of the liquid medium through which the pressure is transmitted from a primary shoe to a secondary shoe, may not prevent the selection of any desired clearance between the shoes and the drum in "off" position, nor result in either of the shoes being brought in contact with the drums when such contact is not desired. My improvement also permits application of braking pressure to the secondary shoes to assist in restraining backward movement of the vehicle.

In the accompanying drawings Figure 1 diagrammatically indicates an application of my invention to the pressure equalizing means of my patent above mentioned; and Figure 2 is an enlarged view of the braking apparatus on a single wheel, the apparatus being the same in structure on each of the wheels, except that the connections which achieve the object of my invention need not be duplicated at each wheel.

In Figure 1 I have shown my invention in association with a well known form of hydraulic means for actuating the primary brake shoes, the liquid pressure being applied by means of the pedal operated piston in the master cylinder 1 to the movable pistons in the wheel cylinders 2 through the piping and flexible hose connections shown. In this apparatus the pressure applied to the floating primary shoes on each of the four wheels is equalized. Brake operating liquid which may be lost from the system by leakage or otherwise is replaced by liquid from reservoir 20 which is connected with the master cylinder through the opening 21, which opening is closed by the piston during its initial motion in brake applying direction. Expansion of the liquid medium, due to high temperature from atmospheric or other sources, merely causes liquid to pass from the master cylinder to the reservoir 20 and thus avoids production of braking pressure when not desired.

Referring now more particularly to Figure 2, the floating primary shoe 3, fixed primary shoe 4, and the fixed secondary shoe 5 cooperate with the brake drum 6, shoes 4 and 5 being mounted on stationary pivot 7 carried on the mounting plate 25. The direction of motion of the drum for forward motion of the vehicle is indicated by the arrow 6ª. One end of the floating primary shoe 3 is pivotally connected with the free end of lever 8, the other end of said lever being mounted on fixed pivot 9 carried on plate 25. A stop 26 limits the movement of the lever 8 in one direction. A cylinder 10 is pivotally connected to link 8 at 11 and the piston 12 operating in this cylinder is pivotally connected at 13 to the secondary shoe 5. Spring 14 connected to the shoe 5, and spring 15 connecting the free ends of the shoes 3 and 4 tend to hold the brake shoes out of contact with the brake drum, and spring 27 tends to sold the shoe 3 in the position shown in which the lever 8 contacts with stop 26. Cam-shaped stops limit the movements of the shoes away from the drum and constitute means for readily adjusting the "off" positions of the shoes to compensate for brake lining wear.

The cylinder 10 communicates with the corresponding cylinder on the opposite wheel of the vehicle through hose and pipe connections 16 or 18, as shown, and the cylinders and piping are filled with a suitable liquid. It results from this arrangement that even though the frictional dragging forces applied by the drums to the primary shoes 3 of the two wheels is unequal, the forces applied to the secondary shoes 5 of these wheels will be equal since the pressure applied to each of the pistons 12 is a liquid pressure which will necessarily be the same in both cylinders. The range of possible motion of the pistons in the cylinders is such that even if one primary shoe applied no pressure at all to its cylinder, the pressure applied by the other primary shoe would be communicated equally to the secondary shoes on both wheels.

Not only does the apparatus described permit the equalization of the pressures on the secondary shoes of either or both pairs of wheels but, as shown in Figure 1, by interconnecting the equalizing connections by pipe 17 the pressures on all four of the secondary shoes will be equalized.

The present invention comprises means for preventing expansion of the liquid medium in the apparatus for equalizing the pressures on the secondary shoes from moving these shoes from their predetermined "off" position, which desirably provides a very small clearance between the shoe and the brake drum, into dragging contact with the drum, and also permits automatic restoration of any fluid in these connections which may be lost by leakage. A convenient specific means for accomplishing the result desired in hydraulically actuated braking apparatus is to connect a cylinder 10 with a hydraulic brake actuating cylinder 2 by means of a pipe 22 and through a very small opening 23 in the wall of the cylinder 10, which opening is so positioned with relation to the sealing cup 24 on the piston 12 that a very slight relative motion of the piston and cylinder, resulting from the pressure applied from the primary shoe during brake application, will close this opening. The connections between the cylinders 10, either when they are in communication in pairs or when the tube 17 is provided whereby they are all in communication with each other, are expansible to sufficient extent under the pressures developed by the primary shoes to permit the necessary relative motion of the piston and cylinder to close the openings 23 even though the fluid employed be incompressible.

It will be noted that the means described places the cylinders of the secondary shoe pressure equalizing mechanism in communication with the liquid of the main brake applying system, whereby liquid interchange may take place both to maintain a proper supply of liquid in the secondary shoe mechanism, and prevent development of pressure in this mechanism under the influence of temperature changes which would move the brake shoes from their "off" positions.

In the form in which all of the cylinders of the secondary shoe equalizing mechanism are interconnected, as shown in Figure 1, the objects of my invention may be accomplished by connecting only one of the cylinders 10 with the liquid containing part of the main brake operating system, but I prefer to so connect both a front and a rear cylinder as shown. When the equalizing mechanisms are connected in pairs (the connection 17 being omitted) one only of the cylinders 10 of a pair need be in communication with the brake operating liquid.

The invention hereinabove described also possesses the advantage that when the brakes are applied to restrain the backing movement of a vehicle the braking pressure applied to the fluid in the wheel cylinder 2 is also applied through the opening 23 to the piston 12 in the cylinder 10, and thus the secondary shoe becomes effective to assist in the braking action.

Having fully described my invention, what I claim as new and desire to secure by Letters Patent of the United States is:

1. The combination comprising a plurality of moving parts, braking mechanism for each part, each mechanism comprising a secondary brake shoe and a primary brake shoe and connections whereby the primary shoe may apply pressure to the secondary shoe, said connections comprising a fluid container and fluid medium therein through which the pressure is applied, means whereby the fluid pressures in said connections are equalized, fluid means, comprising a fluid container, for applying braking pressure to one of aforesaid primary shoes and means for establishing communication between said last mentioned container and a fluid container in said connecting means.

2. The combination with a brake drum, of a primary and a secondary shoe cooperating therewith, said primary shoe being mounted to permit it to move with the drum through a small arc, fluid means for establishing pressure engagement between the primary shoe and the drum and comprising a fluid container, connections whereby the movement of the primary shoe with the drum applies braking pressure to the secondary shoe, said connections comprising a piston chamber mechanically connected to one of said shoes and a piston operating in said chamber and mechanically connected to the other shoe, and means establishing communication between said piston chamber and said first mentioned fluid container when the brake shoes are in "off" position.

3. The combination with a brake drum, of a primary and a secondary shoe cooperating therewith, said primary shoe being mounted to permit it to move with the drum through a small arc, fluid means for establishing pressure engagement between the primary shoe and the drum and comprising a fluid container, connections whereby the movement of the primary shoe with the drum applies braking pressure to the secondary shoe, said connections comprising a piston chamber mechanically connected to one of said shoes and a piston operating in said chamber and mechanically connected to the other shoe, and means establishing communication between said piston chamber and said first mentioned fluid container when the brake shoes are in "off" position, said means comprising a conduit and a passage through the wall of the piston chamber and so located as to be closed by the piston upon relative movement of the piston and chamber.

4. Braking apparatus for a plurality of moving parts, comprising a brake element for each part for restraining its movement, a floating brake element for restraining the movement of one of said parts, means for actuating said last named element and including a liquid pressure chamber, fluid means for transmitting the pressure produced by the braking drag on said floating element to said first mentioned brake elements, and means for establishing fluid communication between said last mentioned fluid means and said pressure chamber.

5. The combination with a brake drum, of a primary and a secondary shoe cooperating therewith, said primary shoe being mounted to permit it to move with the drum through a small arc when the drum rotates in "forward" direction, means preventing the movement of the primary shoe with the drum in the reverse direction, fluid means for establishing pressure engagement between the primary shoe and the drum and comprising a fluid container, connections whereby the movement of the primary shoe with the drum applies braking pressure to the secondary shoe, said connections comprising a fluid container and fluid means therein through which the pressure is applied, and means establishing communication between the first and last mentioned fluid containers during reverse movement of the drum, whereby liquid pressure may be applied from the first mentioned container to the second to apply the secondary shoe.

In testimony whereof, I hereunto affix my signature, this 8th day of March, 1929.

BURNS DICK.